UNITED STATES PATENT OFFICE

ROBERT SUCHY, OF BITTERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR THE PRODUCTION OF PHOSPHORUS AND ALUMINA CEMENT

No Drawing. Application filed March 24, 1928, Serial No. 264,566, and in Germany March 19, 1927.

This invention relates to a process for the production of phosphorus and aluminous cement.

In processes for the direct production of phosphorus and a slag which has the valuable properties of an aluminous cement (fused cement) by melting crude phosphates with carbon and minerals rich in alumina (instead of with silicic acid) there is only a limited selection of raw materials. Although it is possible, in order to keep the percentage of silicic acid in the slag within the requisite low limits to employ raw materials which have a low silicic acid content, that is to say, to employ particularly bauxites poor in silicic acid, such materials always contain a relatively considerable amount of iron. However these materials, although cheaper than bauxites poor in iron, possess the relatively great disadvantage that, when employed in the phosphorus furnace, they give rise to the formation of phosphor-iron owing to their high iron oxide content and thus entail heavy losses in the yield of elemental phosphorus. Thus for example when employing a bauxite containing 20% iron oxide it can be observed that at least 15% of the phosphorus is lost as phosphor-iron.

I have now found that it is possible to use as starting material bauxites having a high iron oxide content when proceeding in the following way: The ferruginous bauxite is melted under reducing conditions with lime in the proportions of about 70 to 90 parts of alumina to 30 to 10 parts of lime, whereby a relatively easily fusible slag of calcium aluminates is formed being almost completely free from iron, since the iron is practically completely separated out in the form of a regulus. The slag of calcium aluminate is then mixed with calcium phosphate and carbon in suitable proportions and worked up in the usual manner in a phosphorus furnace. The phosphorus distills off and is obtained in almost quantitative yield. The slag produced has a low silica content and is, after having been ground, suitable as an aluminous cement.

In this manner a slag poor in silicic acid is obtained in the phosphorus furnace (electric furnace or shaft furnace) without entailing losses of phosphorus due to the formation of phosphor-iron, which, slag, when the ratio of phosphate and additional slag is calculated for the production of an aluminous cement, yields a product of excellent hydraulic properties.

Example

Bauxite containing 65% $Al_2O_3$, 20% $Fe_2O_3$ and 2% $SiO_2$ is fused in an electric furnace together with quick lime and carbon in the proportion of 100:17:10. The slag tapped from the furnace contains about 80% $Al_2O_3$, 19% $CaO$ and 1% $SiO_2$. It is disintegrated, mixed for example with a hardrock phosphate poor in silica containing 35% $P_2O_5$ and 51% $CaO$, in proportion of 1:1.2 in order to establish about equal parts of alumina and calcium oxide in the mixture and further worked up with the addition of carbon in a phosphorus furnace. The phosphorus is obtained in quantitative yield and the slag produced contains on the average about 48% $CaO$, 48% $Al_2O_3$ and 4% $SiO_2$ and thus constitutes an aluminous cement of ordinary composition.

I claim:

1. A process for the simultaneous production of phosphorus and alumina cement from natural calcium phosphates and bauxites, which comprises the steps of melting down under reducing conditions ferruginous bauxites with carbon sufficient to reduce the iron oxide and with calcium oxide in such quantities as to produce a slag containing calcium aluminate and alumina, tapping off separately the regulus of iron and the slag, mixing said slag with calcium phosphates and carbon and melting down the mixture to produce phosphorus, which distills off, and a molten slag which after cooling and grinding constitutes an alumina cement.

2. A process for the simultaneous production of phosphorus and alumina cement from natural calcium phosphates and bauxites, which comprises the steps of melting down under reducing conditions ferruginous bauxites with carbon sufficient to reduce the iron oxide and with calcium oxide in such quantities as to produce a slag containing besides some few per cent of silica, 70 to 90 per cent of alumina and 30 to 10 per cent of calcium oxide, tapping off separately the regulus of iron and the slag, mixing said slag with calcium phosphates and carbon and melting down the mixture to produce phosphorus, which distills off, and a molten slag which after cooling and grinding constitutes an alumina cement.

3. A process for the simultaneous production of phosphorus and alumina cement from natural calcium phosphates and bauxites, which comprises the steps of melting down under reducing conditions ferruginous bauxites with carbon sufficient to reduce the iron oxide and with calcium oxide in such quantities as to produce a slag containing calcium aluminate and alumina, tapping off separately the regulus of iron and the slag, allowing the slag to solidify, disintegrating and mixing said slag with calcium phosphate in a proportion to establish about equal parts of alumina and calcium oxide in the mixture, adding carbon sufficient to reduce the phosphates and melting down the mixture so as to simultaneously produce phosphorus which distills off and a molten slag which after cooling and grinding constitutes an alumina cement.

In testimony whereof I have hereunto set my hand.

ROBERT SUCHY.